United States Patent
Jarvis

(10) Patent No.: US 8,020,779 B2
(45) Date of Patent: Sep. 20, 2011

(54) THERMOSTATIC VALVE AND MIXER TAP WITH INTEGRATED TMV

(75) Inventor: Michael Wellesley Grahame Jarvis, Glasgow (GB)

(73) Assignee: Horne Engineering Limited (GB)

( * ) Notice: Subject to any disclaimer, the term of this patent is extended or adjusted under 35 U.S.C. 154(b) by 450 days.

(21) Appl. No.: 12/205,382

(22) Filed: Sep. 5, 2008

(65) Prior Publication Data

US 2009/0001178 A1    Jan. 1, 2009

Related U.S. Application Data

(62) Division of application No. 12/097,983, filed as application No. PCT/GB2006/004915 on Dec. 22, 2006.

(30) Foreign Application Priority Data

Dec. 23, 2005   (GB) .................................. 0526331.4

(51) Int. Cl.
   *G05D 23/13*      (2006.01)
   *F16K 43/00*      (2006.01)

(52) U.S. Cl. ............... 236/12.11; 236/12.15; 137/15.18; 137/315.12; 137/545

(58) Field of Classification Search ............... 236/12.11, 236/12.15; 137/15.01, 15.18, 315.01, 315.11, 137/315.12, 544, 545
See application file for complete search history.

(56) References Cited

U.S. PATENT DOCUMENTS

| 3,929,283 A | 12/1975 | Delpla |
| 4,475,684 A | 10/1984 | Garlick et al. |
| 5,301,710 A * | 4/1994 | Marandi ..................... 137/15.05 |
| 5,406,974 A * | 4/1995 | Griswold ..................... 137/454.6 |
| 5,433,243 A * | 7/1995 | Griswold et al. ............. 137/498 |
| 5,494,077 A | 2/1996 | Enoki et al. |
| 5,960,828 A | 10/1999 | Grohe et al. |
| 6,059,193 A | 5/2000 | Braathen |
| 6,227,246 B1 | 5/2001 | Hall et al. |
| 6,575,377 B1 | 6/2003 | Graves |

FOREIGN PATENT DOCUMENTS

| AU | 200195150 B2 | 6/2002 |
| DE | 19640509 A1 | 2/1998 |
| EP | 0390121 A1 | 10/1990 |
| EP | 0504427 A1 | 9/1992 |
| FI | 82129 B | 8/1988 |
| GB | 2052019 A | 7/1979 |
| GB | 2325724 A | 2/1998 |
| WO | 9004141 | 4/1990 |
| WO | 9012351 | 10/1990 |
| WO | 0233500 | 4/2002 |
| WO | 2004068252 A2 | 8/2004 |
| WO | 2005028930 A1 | 3/2005 |
| WO | 2005078359 A1 | 8/2005 |
| WO | 2006010880 A1 | 2/2006 |

OTHER PUBLICATIONS

Dept. of Health and the Welsh Office, Sanitary Assemblies 64, Health Technical Memorandum, UK, 1989.

(Continued)

*Primary Examiner* — Marc E Norman
(74) *Attorney, Agent, or Firm* — Pepper Hamilton LLP

(57) ABSTRACT

There is described a mixer tap with integrated thermostatic mixing valve (TMV). The tap comprises in a single housing: hot and cold water inlets; an outlet for mixed water; hot and cold lever controls and a thermostatic mixing device within the single housing to prevent water above a certain temperature being emitted from the common outlet. The cold water control opens a fluid path from the cold inlet to the common outlet, bypassing said thermostatic mixing device, allowing better assurance of purity. The thermostatic mixing device and strainer/check valve cartridges are housed in an internal body so as to be readily accessible for servicing after installation of the device by removing only a cap part of the housing.

12 Claims, 4 Drawing Sheets

OTHER PUBLICATIONS

Improved TMV, HVP (Heating, Ventilating & Plumbing), B&M Publications, Croydon UK, May 2002, p. 94, vol. 23, Issue No. 5.

Advertisement for Horne 4th Connexion, published in HD (Hospital Development), Jan. 2002, Beechwood House Publishing, Essex, UK.

Preventing hot water scalding in bathrooms: using TMVs, BRE Information Paper, Sep. 2003, published by FRE, Watford, UK.

http;//www.armitage-venesta.co.uk/products/3/S/37./242/IPS-Healthcare—Taps—Markwik, Markwik thermostatic mixer (Jul. 23, 2010).

* cited by examiner

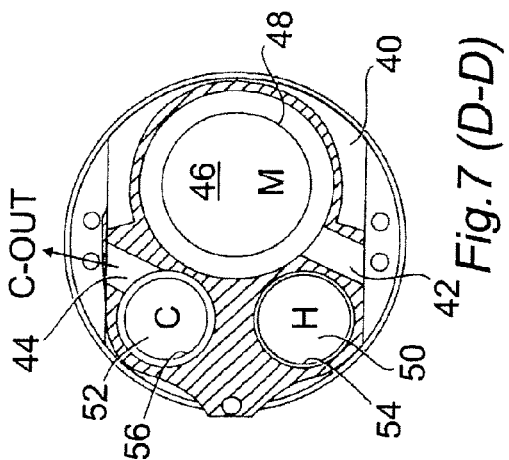
Fig. 5a
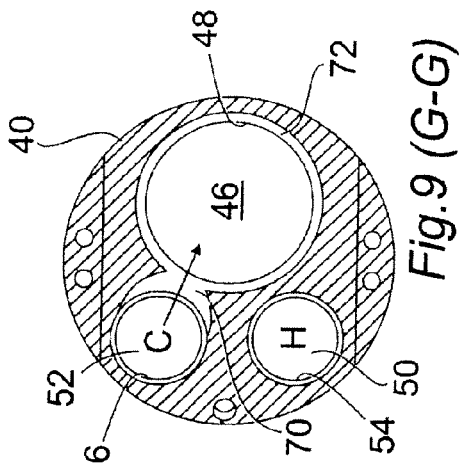
Fig. 5b
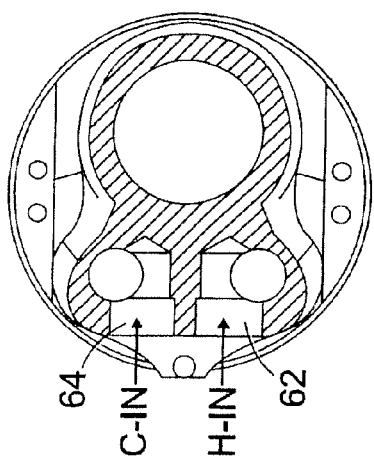
Fig. 6 (A-A)
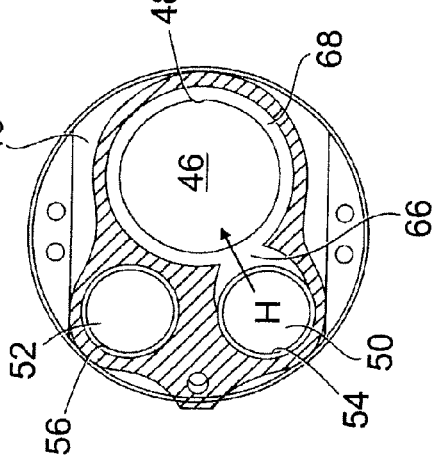
Fig. 7 (D-D)
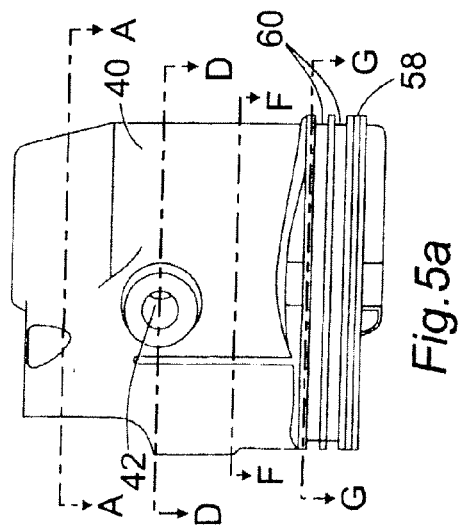
Fig. 8 (F-F)
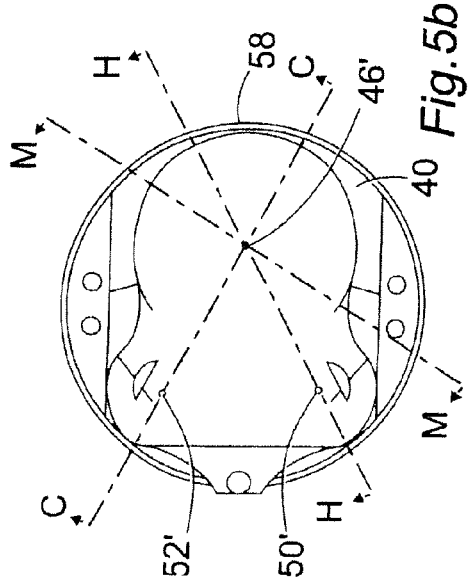
Fig. 9 (G-G)

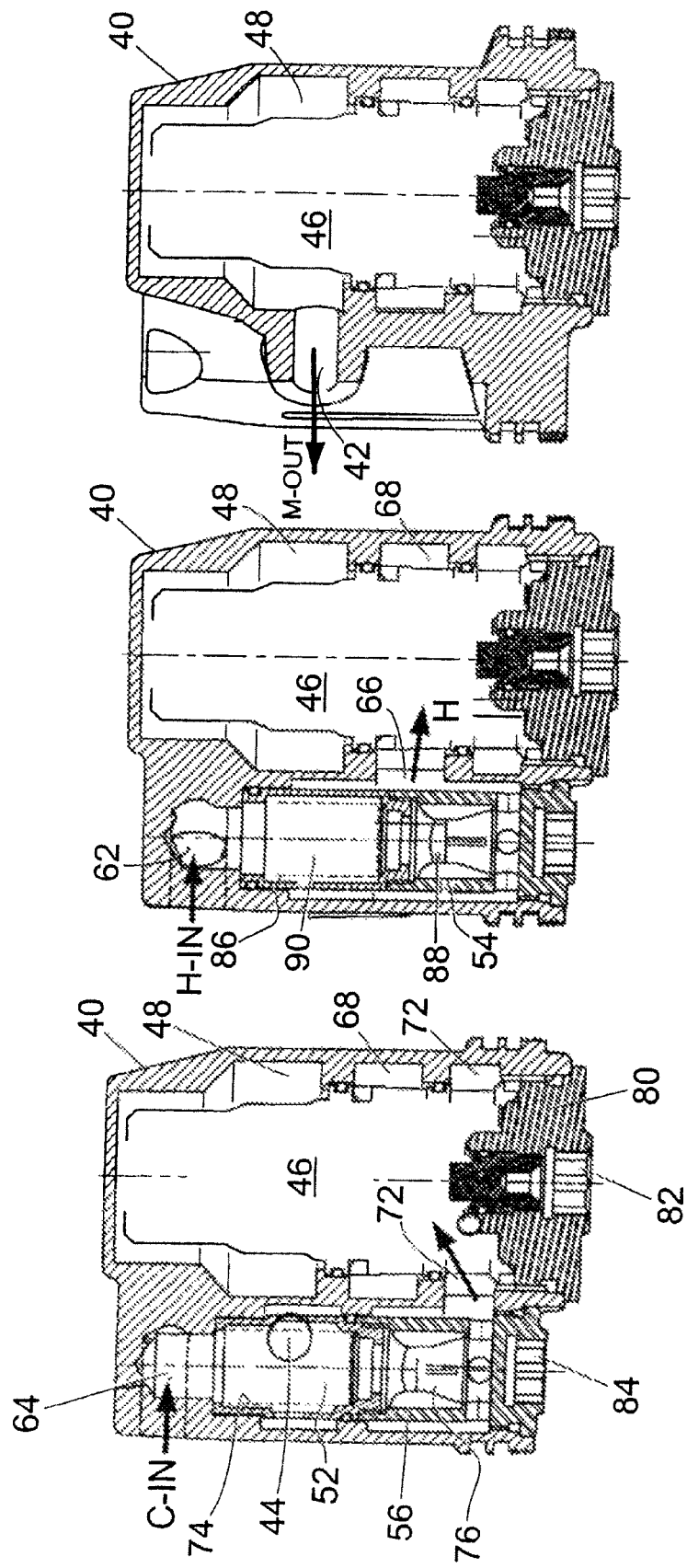

THERMOSTATIC VALVE AND MIXER TAP WITH INTEGRATED TMV

CROSS-REFERENCE TO RELATED APPLICATIONS

This application is a division of U.S. application Ser. No. 12/097,983, filed Oct. 18, 2008, which claims priority to the benefit of Great Britain Patent Application No. 0526331.4, filed Dec. 23, 2005. This application was also filed as International Patent Application PCT/GB2006/004915 with an International Filing Date on Dec. 22, 2006, with subsequent publication as International Publication Number WO 2007/072054 on Jun. 28, 2007. The disclosures of each of the aforementioned patent documents are incorporated herein by reference in their entirety.

Not Applicable

BACKGROUND

The invention in a first aspect relates to mixer taps, also referred to herein as faucets, having separate controls for hot and cold water. The invention in a second aspect relates to thermostatic mixing valve, usable to provide thermostatic regulation of temperature integrated within the tap body or in a separate unit. The two aspects can be combined or used separately.

Mixer taps of various types are known, both for domestic use and for use in institutions such as hospitals, care homes and the like, where safety and ease of maintenance become important. A mixer tap generally comprises hot and cold inlets and a common outlet (spout, nozzle, shower head) for delivering a desired mixture of cold and hot water. Different forms of control are available to regulate the flow and the mix. Separate hot and cold regulating controls are simplest to provide, but can be difficult to adjust before the correct temperature and flow rate is reached. Each control may be a rotary knob or a lever, for example, and may move through a quarter turn or several turns, according to the type of head works. Single-lever mixer tap controls are another option. In one type, similar to a joystick, movement about a first axis regulates the flow and movement about a second axis controls the mix. Another form of control having a single lever is the so-called sequential control in which movement of a single lever about a single axis first enables the flow and then progressively alters the mix (usually starting from cold and progressing toward hot). Yet another form of control popular with thermostatic mixing taps is one in which a first control regulates the flow and a second control regulates the temperature via a thermostatic mixing valve.

For intuitive operation by persons unfamiliar with a particular installation, the applicant believes the simple dual control with one control on the hot water supply and a separate control on the cold water supply is to be preferred. Moreover, the simple dual control permits the user to be sure that a "cold" output contains water purely from the cold supply. Such an assurance is generally required before water can be used for drinking ("potable water"), or even brushing teeth, for example. With the other types of mixer control, there is no certainty that a small proportion of water from the hot supply is not included in the output. This might arise either from failure to set the control lever fully to the cold position, from poor design or from wear and tear of the valve components or from a deterioration in the performance of the thermostat element, due to wear and tear, in a thermostatic tap. In either case, a separate tap for drinking water must be provided, and inconvenience for the user, together with increased installation costs.

In safety-sensitive installations, the "hot" water output is typically a mix of hot water from the domestic hot water services (DHWS) at a temperature which is typically above 50° Celsius and cold water at ambient temperature, provided by a thermostatic mixer to ensure that water above, say, 40 or 42 degrees Celsius cannot be emitted even at the hottest setting. If a variable temperature thermostat is part of the mixing tap, as in a shower installation, then the thermostatic valve is naturally included in the tap body. Where a simple hot/cold mixer tap is required, for example over a basin for washing hands or dishes, the usual solution is to provide a thermostatic mixing valve separately from the tap fitting, for example beneath the sink or behind a wall panel. The same thermostat might provide a supply of such "mixed hot" water for more than one basin, using the DHWS hot and cold water service (CWS) supplies of the building, but only for a few and only in one location.

Thermostatic and other valves require regular maintenance to continue safe operation, and require strainers at their inlets to guard against ingress of particles to the intricate mechanism. All these different parts make the plumbing installation complex and costly to install. Regular maintenance is hampered by the awkward location of the valves under basins and behind panels, and frequently does not take place as it should. To simplify these installations, there have recently been brought to market some mixer taps for institutional applications in which the thermostat for providing a supply of "safe" (mixed) hot water is incorporated within the body of the tap itself. The temperature of mixing may or may not be variable, depending on the design. These new taps still leave a lot to be desired, however, when it comes to ease of maintenance of the thermostat, strainers and the like. The body of the integrated tap may need to be dismantled in several steps and even removed entirely from the wall in some cases, before access is obtained to the thermostat or other parts. Given the bulk of brass (typically) involved in accommodating the mechanism, these bodies may weigh 6 kg or more, and are not trivial to handle safely. Even where the TMV is mounted separately from the tap, servicing can be difficult.

The invention in its various aspects aims to enable the provision of safe hot water while avoiding or reducing one or more of the problems identified above.

SUMMARY

The invention in a first aspect provides a mixer tap comprising in a single housing:
  first and second inlets for receiving water from hot and cold water supplies respectively;
  a common outlet for emitting mixed water to a user;
  manually operable control means whereby a user can regulate the flow of water from the inlets to the common outlet including varying the proportion of hot and cold water emitted; and
  a thermostatic mixing device within the single housing arranged to receive and mix hot and cold water from said inlets and supply mixed water to the common outlet under control of said control means, thereby to prevent water above a certain temperature being emitted from the common outlet,
  wherein said control means includes a dedicated cold water control operable by the user to open a fluid path from the cold inlet to the common outlet bypassing said thermostatic mixing device.

By this step, the benefits of an integrated tap are combined with the facility to obtain a pure cold water supply. Depending on the detailed construction and of course the supplies themselves, this output may or may not strictly be potable, but at least it is known not to include water from the hot supply.

The control means may comprise separate first and second controls nominally for regulating the hot and cold water independently, the first control in fact regulating flow of mixed water from the thermostatic mixing device to the common outlet, while the second control is said dedicated cold water control. In such an embodiment, the simplicity of operation and low cost of the most conventional mixer tap is combined with the integrated thermostatic safety function in a manner transparent to the user.

The thermostatic mixing device may include means for adjusting its output temperature. The adjusting means may be arranged to be manually operable by the user, or hidden for operation by service personnel only.

The thermostatic mixing device may comprise a cartridge located in a chamber accessible by removing part of the single housing, in accordance with the second aspect of the invention defined below.

The single housing may also provide chambers accommodating first and second strainer cartridges for blocking the passage of debris from the first or second inlet to the mixing device.

The second strainer cartridge may serve also to block the passage of debris from the second inlet to the dedicated cold water control as well as to the mixing device.

The housing may further accommodate first and second check valves for blocking the passage of water out through said inlets. The first and second check valves may be integrated in the first and second strainer cartridges respectively with the check valves preferably downstream from the strainers so that the strainers protect the check valves from damage due to debris.

The first and second strainer cartridges and thermostatic mixing device may all be accessible for servicing by removal of a single cover part of the housing.

The housing may comprise a monolithic inner body housing said thermostatic mixing device and being located within an outer casing, wherein a sealed space within the outer casing serves as a duct to pass water from a port formed in the inner body to said outlet.

Said inner body may comprise first and second ports for emitting mixed and cold water respectively into the outer casing, the control means engaging with said ports to regulate the flow from each to the outlet.

In an embodiment with strainer cartridges, these may also be located within the monolithic inner body.

The tap may further comprise integrated isolating valves for isolating serviceable components including the mixing device from said inlets. Said isolating valves may be located within a spigot adapted for interfacing the single body to a supporting panel (wall, sink surround, worktop or the like), access for operating the isolating valves being provided without requiring access behind said panel.

The invention in the second aspect provides a thermostatic mixing device comprising in a single housing:
   first and second inlets for receiving water from hot and cold
      water supplies respectively;
   an outlet for emitting mixed water to a user; and
   a thermostatic mixing device within the single housing
      arranged to receive and mix hot and cold water from said
      inlets and supply mixed water to the common outlet,
   wherein said thermostatic mixing device is made accessible for servicing after installation of the device without demounting any major part of said housing.

The device in one embodiment is a thermostatic mixer tap with integrated thermostatic mixing valve, the outlet being adapted for emitting said mixed water to a user, the device further comprising within said single housing:
   manually operable control means whereby a user can regulate the flow of water from the inlet ports to the outlet.

A "major part" in this context might be defined as any part or combination of parts comprising more than 30% of the weight of the complete device contained within and including said single housing.

The thermostatic mixing device may be in the form of a cartridge removable from the housing for servicing or replacement.

The thermostatic mixing device may be accessible through an opening in said single housing. The tap may further comprise a cover for hiding said opening in normal use, the cover preferably being independent of any functional component of the tap and preferably comprising less than 10%, preferably less than 7.5% and even less than 5% by weight of the complete tap as contained within and including said single housing. Even if a cover must be removed, this will be a far simpler and safer operation than in known integrated thermostatic mixer taps. In one known example from a major manufacturer, to access the thermostatic cartridge, first the temperature adjusting knob is removed, then the flow control lever (both brass die-castings), then the shower hose and connector are removed; then a light plastic cover is removed. Following this a large gear assembly and large ceramic disc are removed with five 5 no. M6 bolts, giving access to the thermostatic cartridge. The cover part may be located on an underside of the tap when installed.

The thermostatic mixing device may include means for adjusting its output temperature. The adjusting means may be arranged to be manually operable by the user, or hidden for operation by service personnel only.

The single housing may also accommodate first and second strainers for blocking the passage of debris from the first or second inlet to the mixing device, said strainers also being made accessible for servicing after installation of the tap without dismantling said control and without demounting said single housing.

The housing may further accommodate first and second check valves for blocking the passage of water out through said inlets, said check valves also being made accessible for servicing after installation of the tap without dismantling said control and without demounting said single housing.

The first and second check valves may be integrated in cartridges with the first and second strainers respectively with the check valves preferably downstream from the strainers so that the strainers protect the check valves from damage due to debris.

The first and second strainers/cartridges and thermostatic mixing device may all be accessible for servicing by removal of a single cover of the housing. The cover part may comprise less than 10%, preferably less than 5% by weight of the complete tap as contained within and including said single housing. In the known example mentioned above, the main casting of the tap weighing over 5 kg must be removed from the permanently mounted piece weighing only 1 kg, in order to service the strainers and check valves (although check valves rarely require attention).

The housing may comprise a monolithic inner body housing said thermostatic mixing device and being located within an outer casing, wherein a sealed space within the outer casing serves as a duct to pass water from a port formed in the inner body to said outlet.

In an embodiment with strainer cartridges, these may also be located within the monolithic inner body.

The tap may further comprise integrated isolating valves for isolating serviceable components including the mixing device from said inlets. Said isolating valves may be located within a spigot adapted for interfacing the single body to a supporting panel (wall, worktop or the like), access for operating the isolating valves being provided without requiring access behind said panel.

BRIEF DESCRIPTION OF THE DRAWINGS

Embodiments of the invention will now be described, by way of example only, by reference to the accompanying drawings, in which:

FIG. 5 shows (a) side elevation and (b) plan view of the internal body with section lines A-A, D-D, F-F, G-G, C-C, H-H and M-M;

FIGS. 6 to 12 are sectional views on the lines A-A, D-D, F-F, G-G, C-C, H-H and M-M, respectively.

NOTE: The legends C, H and M are used at various points in the description and drawings to indicate ports and spaces provided for the flow of cold, hot and mixed water, respectively. Unless the context requires otherwise, "M" and "mixed" in this case refer to the "safe hot" water emitted by the thermostatic mixing device, prior to any mixing with cold water that occurs under user control on the way to the common outlet.

DETAILED DESCRIPTION OF THE EMBODIMENTS

Figure 1:
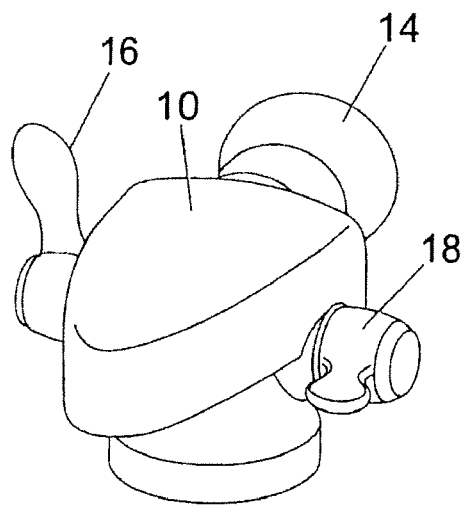
FIGS. 1 to 3 are external perspective views of a mixing tap including a thermostatic mixing device in accordance with one embodiment of the present invention in both first and second aspects.

FIG. 1 is a front perspective view of a thermostatic bib tap having an upper casing portion 10 housing a spout and a lower casing portion 12 housing operating parts to be described below. Portions 10 and 12 in this example are formed in a single piece although that is not essential. A spigot 14 is provided for attaching the tap to a wall. An on/off control 16 for hot water is located on the left-hand side of the body (as viewed by the user) and an on/off control 18 for cold water is provided on the right hand side of the body. Each control is of the quarter turn type, with a short lever moving from an upright (off) position as shown at the left to a forward (on) position as shown at the right. Off/on positions may equally be reversed, depending on the type of lever and ergonomic considerations. Spindle controls may equally be used, requiring more than a complete revolution to move from fully on to fully off.

Figure 2:
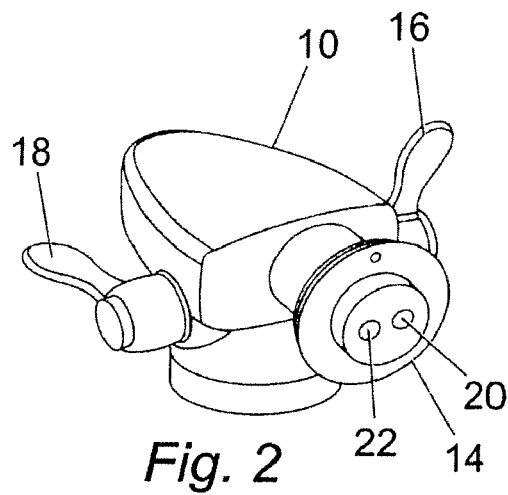

In the rear view of FIG. 2, more detail of the spigot 14 can be seen, including a flange where it mounts to the wall. Within the spigot are entrance ports for connection to the water supply, including a hot water supply port 20 and cold water supply port 22. The construction is modular so that different lengths of spigot can be provided according to the setting. Different forms of spigot can be provided, adapted for example for supporting the tap on a horizontal worktop panel instead of a wall panel, or for mounting directly onto exposed pipe-work.

Figure 3:
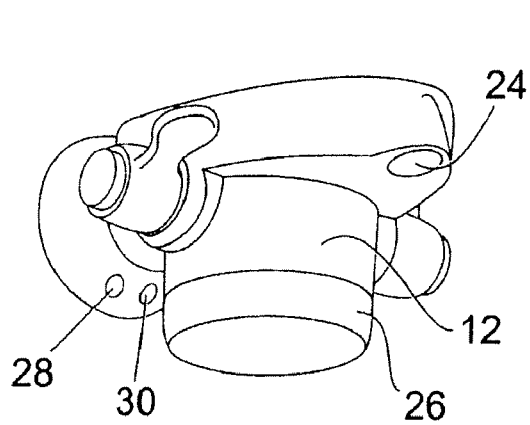

The underside view of FIG. 3 shows the outlet port (spout) 24 which emits a flow of water which may be a mixture between cold and hot, according to the positions of the controls 16 and 18. The tap in this particular example includes a thermostatic device for mixing hot and cold supply water to a "safe hot" temperature, so that hot water from the entrance port 22 is never supplied directly from the DHWS to the outlet 24. The thermostat may deliver "hot" water at 40° C., for example, while the DHWS supply itself is at a more dangerous 60°, 70° or (for example in the event of a failure of the temperature control at the DHWS calorifier, hot water generator or hot water boiler) 80° C.

The thermostatic device is housed with other components in the lower housing portion 12, and a screw cap 26 is provided which can be removed to permit access for servicing and/or replacement of these parts. To facilitate the servicing operations, ball valves are integrated into the spigot 14 and accessed through small ports 28 (hot) and 30 (cold), for example using a screwdriver. In this way, a thermostatic safety device is included within the body of the tap itself, with integrated isolating valves, but in such a way as to allow easy access for servicing. Compared with other known designs, there is no need to remove or disassemble heavy parts of the tap, nor access isolating and/or thermostatic valves behind the wall panel to which the tap is affixed. These features are of tremendous benefit in hospital and other institutional environments, where there may be hundreds of such fittings which require to be serviced in an economic and safe manner on a regular basis.

Figure 4:
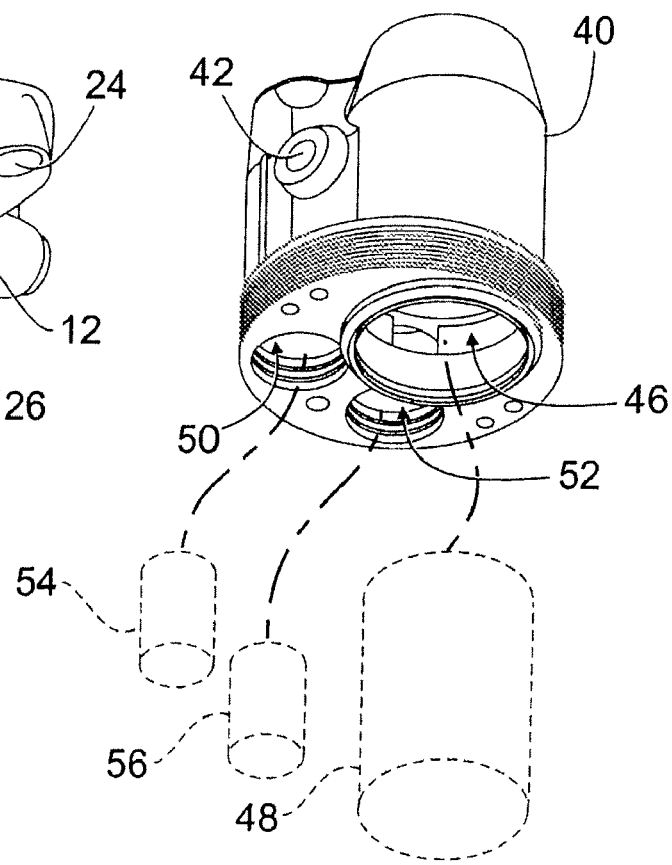
FIG. 4 shows a main internal body of the tap receiving three serviceable parts from below.

FIG. 4 shows an internal body 40 which may be a forging of solid brass, for example, and is housed within the lower body portion 12 of the tap. Although shown with the housing removed, internal body 40 is intended to be permanently secured and sealed within the body 10/12 before installation, and not removed for routine servicing.

As will be described in more detail with reference to FIGS. 5 to 12, the internal body 40 provides various ports, ducts and chambers. Visible in FIG. 4, there is a hot water outlet 42 which co-operates with control 16 to allow hot (mixed hot) water into the upper part 10 of the housing, and hence to the spout 24. A similar port 44 (at the rear as seen in FIG. 4) provides the outlet for cold water in co-operation with control 18.

As can be seen in the underside of body 40 there is a large opening for receiving a thermostatic mixing cartridge into a large mixing chamber 46 within the body 40. Further chambers 50 and 52 are provided to receive strainer and check valve cartridges 54 and 56 for the hot water and cold water supplies respectively. It will seen that these three items are readily accessible for servicing as soon as the cover 26 is removed from the tap housing, even though the housing and internal body part 40 remain undisturbed in relation to each other and the wall mounting. Needless to say, the isolating valves 28 and 30 in the spigot are to be closed before any of the cartridges is removed for servicing.

FIG. 5(a) is a side view of the internal body 40. A threaded portion 58 provides for mounting of the cap 26, while seats 60 for O-rings facilitate a watertight seal within housing part 12. FIG. 5(b) is a plan view of the internal body 40, in which the axes of the mixing chamber 46, the hot water strainer and check valve cartridge chamber 50 and the cold water strainer and check valve cartridge chamber 52 are marked at 46', 50' and 52' respectively. The various plan sectional views are FIGS. 6 to 9 and vertical sectional views are FIGS. 10 to 12 will now be described, with different features of the internal structure of the main internal body 40 being visible in each section.

In FIG. 6 (section A-A) we see inner ports 62 and 64 receiving the supplies of hot and cold water from the external ports 20 and 22 respectively. An upper portion of the mixing chamber 46 can be seen.

FIG. 7 shows the section on plane D-D, which is at the level of the outlet ports 42 (mixed hot water) and 44 (cold water). The thermostatic cartridge 48 can be seen in outline within mixing chamber 46. The internal form of the mixing cartridge is not relevant to an understanding to the present invention. It may for example be of the form described in our European patent EP0448315B1. Strainer cartridge 56 can be seen within the cold strainer/check valve chamber 52. It will be seen immediately that the mixed hot outlet port 42 leads from the mixing chamber out to the hot water control 16, whereas the cold water outlet port 44 leads directly from the cold water inlet strainer chamber 52 to the outlet 44 and out through cold control 18.

FIG. 8 on section F-F shows the transfer port 66 by which supply hot water enters a hot gallery space 68 surrounding the mixer cartridge 48 from chamber 50. Similarly, FIG. 9 on section G-G shows a cold water transfer port 70 leading from the chamber 52 into a cold water gallery 72 surrounding the mixing cartridge 48.

FIG. 10 is a section in the vertical plane C-C of FIG. 5(*b*), showing further detail of the components and pathways related to the cold water. Cold water inlet 64 is seen at the top left, which leads into the cold water strainer/check valve chamber 52. Strainer/check valve cartridge 56 houses in its upper portion a straining mesh 74 and in its lower portion a check valve 76, which is to prevent contamination by the reverse flow of water from inside the valve towards inlet 64. At the back side of chamber 52 the direct cold water outlet 44 can be seen, while the cold transfer port 70 allows passage of cold water from the check valve 76 into cold water gallery 72. Again, internal details of the mixing cartridge 48 are not shown, but it can be seen that O-rings and bridge formations within mixing chamber 46 isolate the galleries 68 and 72 from one another, and from the upper space into which the cartridge 48 dispenses mixed water at a controlled temperature. Cartridge 48 is mounted on a cap 80, which can be screwed out of the opening in body 40 to replace or service the thermostatic control. Hexagonal recesses 82 and 84 are provided for removing the mixing cartridge and cold strainer cartridge respectively using a standard hexagonal key. A temperature adjusting screw at the centre of the cap can be accessed to adjust the mixed water temperature without removing the cartridge. It will be understood that these can be accessed once the cap 26 (FIG. 3) is removed from the housing.

FIG. 11 is a similar cross-section but on line H-H, showing the parts relating primarily to the hot water. The hot water inlet 62 can be seen at the top left, leading into space 50 where the hot water strainer cartridge 54 includes straining mesh 86 and check valve 88. Hot water is led from the check valve outlet through hot water transfer port 66 into hot water gallery 68 surrounding the mixing cartridge 48.

Finally, FIG. 12 shows in section M-M the outlet 42 for mixed water, which flows if permitted by control 16, into a final mixing space and duct within the outer housing 10 and hence to the spout 24.

Distinctive features of the tap described relate to the ease of servicing of the tap components and also its basic functionality, comprising to the provision of a "pure" cold water outlet.

Concerning ease of servicing, conventional plumbing installations for hospitals and similar institutions which include thermostatic mixers for the provision of "safe" hot water use conventional hot and cold taps or mixer taps, with thermostatic valves located beneath the wash basin or behind a wall panel, where they can be difficult to access. Isolating valves and strainers are likewise difficult to access. Although before the present priority date there have been shown examples of integrated thermostatic mixer taps of the general type described herein, these do not necessarily integrate all the components (thermostatic cartridge, strainers, check valves and isolating valves), so that demounting of the tap and/or access behind or beneath panels is still required for many servicing operations. Moreover, access to the thermostatic elements, check valves etc. in all the known examples requires demounting and/or disassembly of the tap to some degree or another, whereas all of said parts are accessible in the present design by simply unscrewing the cap 26 from under the housing. Not only is the time and money spent in servicing operations reduced by this measure, but the likelihood that proper maintenance will be performed at all is greatly increased. Moreover, the dismantling and moving of body components which can weigh several kilograms in practice is avoided, reducing the risk of injury to service personnel and damage to the basin and surrounding décor.

Concerning the second advantage, conventional mixing taps, particularly those with thermostats, cannot be guaranteed to provide and output of cold water directly from the cold water supply, even when apparently set to their coldest setting. This renders them unsuitable for the supply of drinking water, or even water for brushing teeth etc. In the model illustrated, provided the hot control 16 is shut off, operation of the cold control 80 can provide pure water through spout 24. Depending on the ducting within the upper portion 10 of the housing, mixing of water from the outlets 42 and 44 may occur between the controls 16, 18 and the spout 24, in which case a short flushing period may be required to displace residual mixed water. In other embodiments, the paths from the outlets 42 and 44 to the spout 24 can be entirely separated by suitable barriers and seals, so as to provide a true potable water supply by operation of the cold control 18. The user has no need then to be concerned with the difference between the mixing tap and drinking water supplies.

These and other modifications can be made without departing from the spirit and scope of the invention as defined in the appended claims. It will be appreciated that different forms of body may be provided, different spout arrangements, mounting arrangements and control arrangements can be substituted for those shown in this example. Additional components such as flow restrictors can be included as desired.

As one illustration, the lever action of either control may be reversed and/or replaced with a spindle or other type of flow regulation mechanism.

Figure 13:
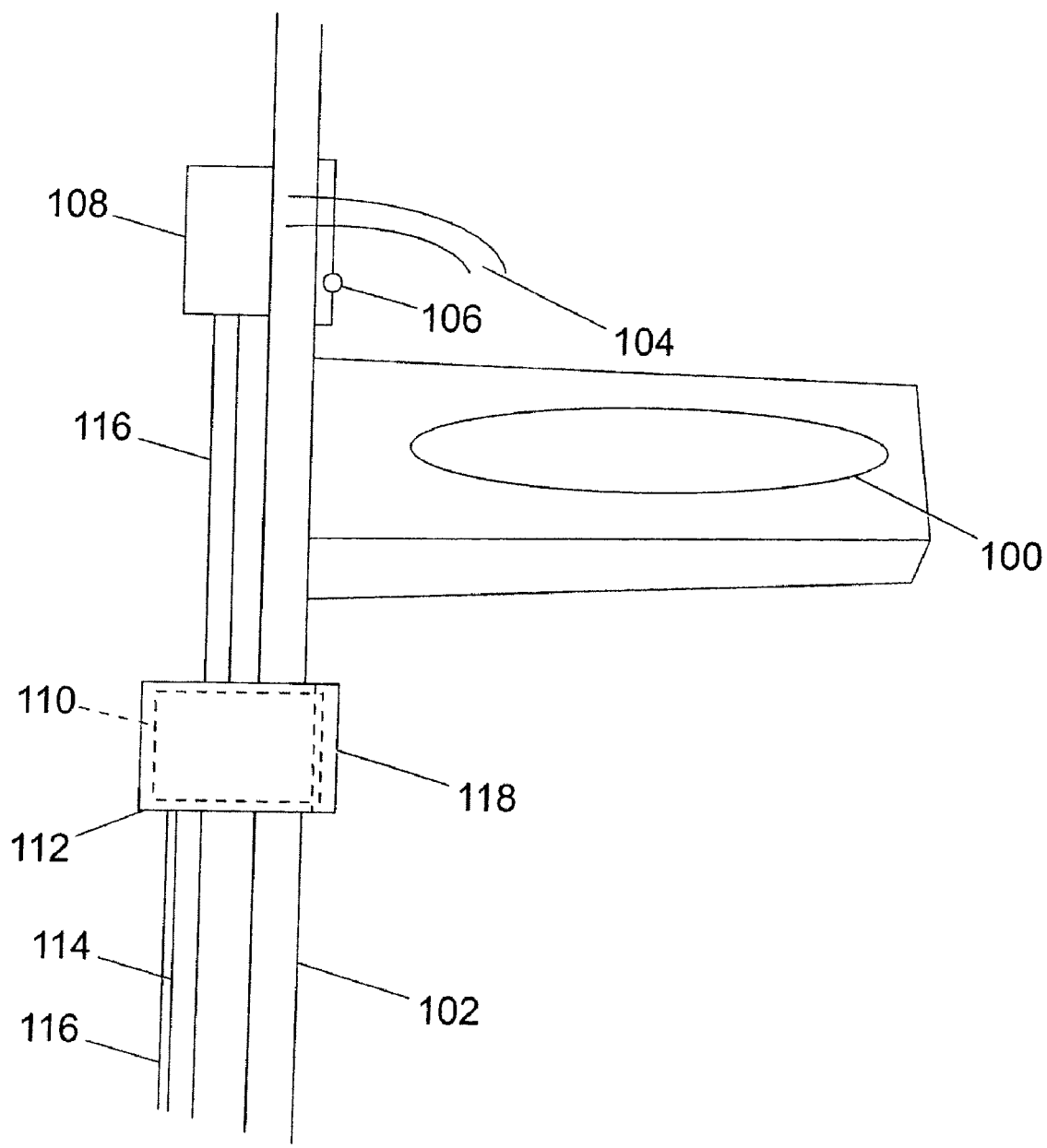
FIG. 13 shows schematically another application of the serviceable mixing device, embodying the second aspect of the invention as set forth above.

As another illustration, FIG. 13 illustrates a thermostatic mixing device having easy servicing features similar to the mixer tap with integrated TMV described above, but in a slightly different application. Here, water is to be supplied to a wash hand basin 100, mounted on a wall 102. The tap is of a no-touch (electronic) type, delivering water from a spout 104, under control of an infra-red or similar proximity sensor 106. These elements are part of an electronic valve assembly, whose functional parts are mounted in a body 108 behind the wall panel. In order to regulate the outlet temperature, a thermostatic mixing device 110 of the type seen in FIGS. 4-12 is mounted behind the wall 102 in housing 112. Hot and cold supply pipes 114 and 116 enter the housing 112 and are coupled to inlets 62 and 64 of the device, while outlet pipe 116 leads safe hot water from the mixed water outlet of the device 110 to the electronic valve 108.

Device 110 includes an internal body and serviceable cartridges substantially the same as body 40 and cartridges 48, 54, 56 of FIGS. 4-12. It is a simple matter for the person skilled in the art to provide a housing 112 which leads water from the mixed water outlet 42 of the internal body 40 to a pipe connection, rather than directly to the control valves and mixing space of the integrated mixer tap. Housing 112 projects through the wall 102, where cap 118 (similar to cap 26 in FIGS. 1-3) is accessible and readily removable for servicing of the thermostatic mixing cartridge, check valves and strainers. Of course the housing 112 need not be mounted in a wall panel. Where it is, the housing and/or wall 102 can be adapted also to provide screwdriver access to isolating valves (not shown in FIG. 13) at the inlets, just as in the integrated version of FIGS. 1-3.

It will be appreciated that housings 112 and 108 can be integrated if desired, providing the tap and servicing cover 118 in one place. Similarly, the thermostatic mixing device can be used with a mixing tap to mix both cold and safe hot water in varying proportions, with the user controls and outlet in a separate housing from the thermostatic mixing device, rather than integrated as in FIGS. 1-3. Compared with the illustration of FIG. 13, in that case, both cold and mixed outlet pipes would be used to transfer water from device 110 to the tap body 108. Housing 112 could be adapted to lead the 'pure cold' water outlet 44 to a second outlet pipe connection. Alternatively, since the housings for the mixer and tap are now separate, a 'pure cold' connection can be made simply enough by pipework direct to the tap body.

What is claimed is:

1. An apparatus, in a single housing, comprising:
    first and second inlets for receiving water from hot and cold water supplies respectively;
    an outlet for emitting mixed water;
    a thermostatic mixing device within the single housing arranged to receive and mix hot and cold water from the inlets and supply mixed water to the outlet; and
    first and second strainers positioned within the single housing for blocking the passage of debris respectively from the first or second inlet to the mixing device,
    wherein the thermostatic mixing device and the first and second strainers are positioned in respective chambers in the housing, the chambers lying generally parallel with one another and extending into the housing from respective openings so as to be accessible side-by-side for servicing after installation of the device without demounting a housing part, or a combination of housing parts, comprising more than 30% of a total weight of the housing and an apparatus contained therein.

2. The apparatus of claim 1 further comprising:
    a thermostatic mixer tap; and
    a manually operable control means within the single housing, whereby a user can regulate a flow of water from the inlets to the outlet and wherein the mixing device and the first and second strainers are accessible for servicing without dismantling the control means.

3. The apparatus of claim 1 wherein the thermostatic mixing device is in a cartridge removable from its opening in the single housing for one or more of servicing and replacement.

4. The apparatus of claim 1, further comprising:
    a cover part for hiding the opening of the mixing device in use.

5. The apparatus of claim 4 wherein the thermostatic mixing device includes means for adjusting its output temperature, the adjusting means being hidden by the cover part for operation by service personnel only.

6. The apparatus of claim 5, wherein the cover part comprises less than 10% by weight of the apparatus as contained within and including the single housing.

7. The apparatus of claim 4, wherein the first and second strainers and the thermostatic mixing device are all accessible for servicing by removal of the cover part.

8. The apparatus of claim 1 wherein the housing further accommodates first and second check valves for blocking a passage of water out through the inlets, the check valves also being made accessible for servicing after installation of the apparatus without demounting the single housing.

9. The apparatus of claim 8 wherein the first and second check valves are integrated in cartridges with the first and second strainers respectively, with the check valves downstream from the strainers so that the strainers protect the check valves from damage due to debris and the check valves are serviceable through the same openings as the first and second strainers.

10. The apparatus of claim 1 wherein the housing comprises a monolithic inner body located within an outer casing, the inner body defining the chambers housing the thermostatic mixing device and the first and second strainers, and wherein a sealed space within the outer casing serves as a duct to pass water from a port formed in the monolithic inner body to the outlet.

11. The apparatus of claim 1, further comprising:
    integrated isolating valves for isolating serviceable components including the mixing device from the inlets.

12. The apparatus of claim 11 wherein the isolating valves are located within a spigot adapted for interfacing the single housing to a supporting panel, access for operating the isolating valves being provided without requiring access behind the panel.

* * * * *